US010323405B2

(12) United States Patent
Seavy

(10) Patent No.: US 10,323,405 B2
(45) Date of Patent: Jun. 18, 2019

(54) SYSTEM FOR CONNECTING STRUCTURAL ELEMENTS OF PREFABRICATED JAIL CELLS

(71) Applicant: Richard Jay Seavy, Penrose, CO (US)

(72) Inventor: Richard Jay Seavy, Penrose, CO (US)

( * ) Notice: Subject to any disclaimer, the term of this patent is extended or adjusted under 35 U.S.C. 154(b) by 0 days.

(21) Appl. No.: 15/658,506

(22) Filed: Jul. 25, 2017

(65) Prior Publication Data
US 2019/0032325 A1  Jan. 31, 2019

(51) Int. Cl.
| E04B 1/348 | (2006.01) |
| E04B 1/08 | (2006.01) |
| E04B 2/58 | (2006.01) |
| E04H 3/08 | (2006.01) |
| E04B 2/74 | (2006.01) |
| E04B 2/76 | (2006.01) |
| E04B 1/24 | (2006.01) |
| E04B 1/61 | (2006.01) |
| F16B 5/02 | (2006.01) |
| E04C 2/38 | (2006.01) |
| E04B 1/343 | (2006.01) |

(52) U.S. Cl.
CPC .............. *E04B 1/3483* (2013.01); *E04B 1/08* (2013.01); *E04B 1/24* (2013.01); *E04B 1/34321* (2013.01); *E04B 1/6116* (2013.01); *E04B 2/58* (2013.01); *E04B 2/74* (2013.01); *E04B 2/7401* (2013.01); *E04B 2/76* (2013.01); *E04C 2/384* (2013.01); *E04H 3/08* (2013.01); *F16B 5/02* (2013.01)

(58) Field of Classification Search
CPC . E04B 1/08; E04B 2/58; E04B 1/3483; E04B 2103/06; E04B 2/74; E04B 2/7401; E04B 2/76; E04B 1/6116; E04B 1/24; E04H 3/08; F16B 5/02; E04C 2/384
See application file for complete search history.

(56) References Cited

U.S. PATENT DOCUMENTS

| 1,813,909 | A | * | 7/1931 | Brainard | ................ E04C 2/384 52/206 |
| 2,704,301 | A | * | 3/1955 | Feketics | ............... H05K 9/0001 174/363 |
| 3,070,646 | A | * | 12/1962 | Lindgren | ............. H05K 9/0001 174/373 |
| 3,229,431 | A | * | 1/1966 | Paul | .................... E04L 31/3483 52/781 |

(Continued)

FOREIGN PATENT DOCUMENTS

WO  WO-2015071544 A1 *  5/2015  ............... E04B 1/08

Primary Examiner — Adriana Figueroa
Assistant Examiner — Jessie T Fonseca
(74) Attorney, Agent, or Firm — Hanes & Bartels LLC

(57) ABSTRACT

The prefabricated jail cells to which the connection system of this invention relates comprises a plurality of rectangular structural elements, including rear, side and front walls, each comprising studs and a steel wall plate forming the inside surface of the wall. According to the invention, a structural channel is attached to the back side of the extended end of the wall plate and defines the end of the structural wall element. The connection between two of such structural elements is made with a nut and bolt where the bolt passes through the web of the end-defining channel, through the adjacent wall plate and into and through a connecting component of the wall element to be connected.

7 Claims, 4 Drawing Sheets

(56) References Cited

U.S. PATENT DOCUMENTS

| | | | | | |
|---|---|---|---|---|---|
| 3,292,323 | A | * | 12/1966 | Hagan | F16B 12/02 |
| | | | | | 211/182 |
| 3,322,879 | A | * | 5/1967 | Lindgren | G10K 11/16 |
| | | | | | 174/371 |
| 3,994,105 | A | * | 11/1976 | Jamison | B32B 3/12 |
| | | | | | 52/127.12 |
| 4,806,703 | A | * | 2/1989 | Sims | H05K 9/0001 |
| | | | | | 174/373 |
| 4,843,788 | A | * | 7/1989 | Gavin | E04H 3/08 |
| | | | | | 128/846 |
| 5,029,518 | A | * | 7/1991 | Austin | F24F 3/161 |
| | | | | | 454/185 |
| 5,044,134 | A | * | 9/1991 | Brockway | E04L 31/0007 |
| | | | | | 52/238.1 |
| 7,318,300 | B1 | * | 1/2008 | Seavy | E04H 3/08 |
| | | | | | 52/106 |
| 8,875,446 | B2 | * | 11/2014 | Smith | E04L 31/34321 |
| | | | | | 109/1 S |

* cited by examiner

US 10,323,405 B2

SYSTEM FOR CONNECTING STRUCTURAL ELEMENTS OF PREFABRICATED JAIL CELLS

BACKGROUND

Apparatus for constructing and interconnecting modularized jails cells into a prison complex is the subject of U.S. Pat. Nos. 7,178,297 and 7,318,300 to Richard J. Seavy. The general construction of the jail cells of those patents bears many things in common with the present invention however, the novel improvements of the present invention have as their primary objective the interconnections between the structural elements of one cell, that is, side, front and rear walls and the interconnections between adjoining jail cells that permit the cells to be factory constructed as prefabricated components which can be transported in more compact form than factory modularized cells, thus significantly increasing the economics of cell delivery.

SUMMARY OF THE INVENTION

The prefabricated jail cells to which the connection system of this invention relates comprises a plurality of rectangular structural elements, including rear, side and front walls, each comprising a steel wall plate forming the inside surface of the wall. A plurality of mutually parallel and spaced apart studs in the form of structural channel members are attached to the back side of the wall plate. According to the invention, another structural channel is attached to the back side of the extended end of the wall plate and defines the end of the structural element. The connection between two structural elements is made with a nut and bolt where the bolt passes through the web of the end-defining channel, through the adjacent wall plate and into and through a connecting component of the element to be connected. The inventive combination can take different forms, as shown in the follow detailed descriptions.

DETAILED DESCRIPTION OF SEVERAL SPECIES OF THE INVENTION

Figure 1:
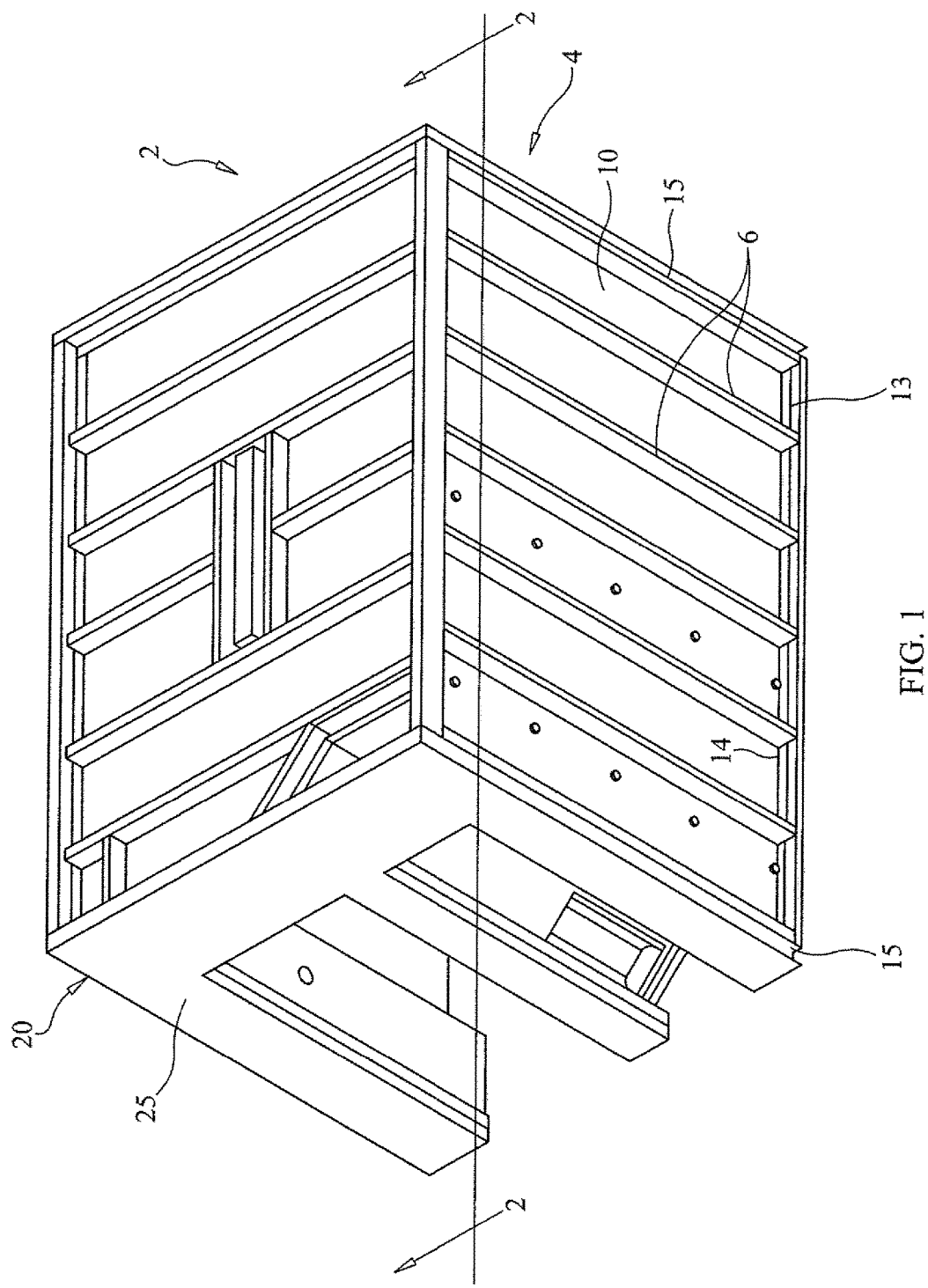
FIG. 1 is a perspective view of a single prefabricated jail cell showing the interior structure of the right side wall which is adapted to be mated with a similar left wall of an adjoining cell and showing the interior structure of the ceiling which is adapted to be mated with a similar floor structure of a stacked cell.

The prefabricated jail cell 2 to which the present invention applies is illustrated in FIG. 1. The construction of the right side wall 4 is typical of the construction of the rear, front and left side walls where a plurality of mutually parallel and spaced apart studs 6 support a steel inside wall plate 10 which constitutes the inside surface of the side wall of the cell 2. The exposed studs, as shown in FIG. 1, are in anticipation of the right side wall being joined together with the left side wall of an attached adjoining cell of similar construction. The bottom edge of the side wall is delineated by a structural channel member 13 whose open side faces upwardly and one flange 14 of which is secured to the back side of the wall plate 10. The studs 6 are also formed of structural channels, one flange of which is attached to the back side of the wall plate 10. The front and rear edges of the side wall are defined by structural channels 15, the webs 17 of which are flush with and attached to the back side surface of the wall plate 10. The open side of the end-defining channels 15 face in a direction perpendicular to the plane of the wall plate 10.

The basic construction of the front wall 20 is similar to that of the side wall 4 and, in addition to an interior wall plate secured to the channel studs, contains an exterior wall plate 25, since the front wall will not be joined to another cell.

The foregoing described fundamental constituents of the exemplary jail cell 2 will be referred to by the same reference numerals in the following descriptions of several species of the invention as applied to different interconnections of the structural elements of the jail cell.

Figure 2:
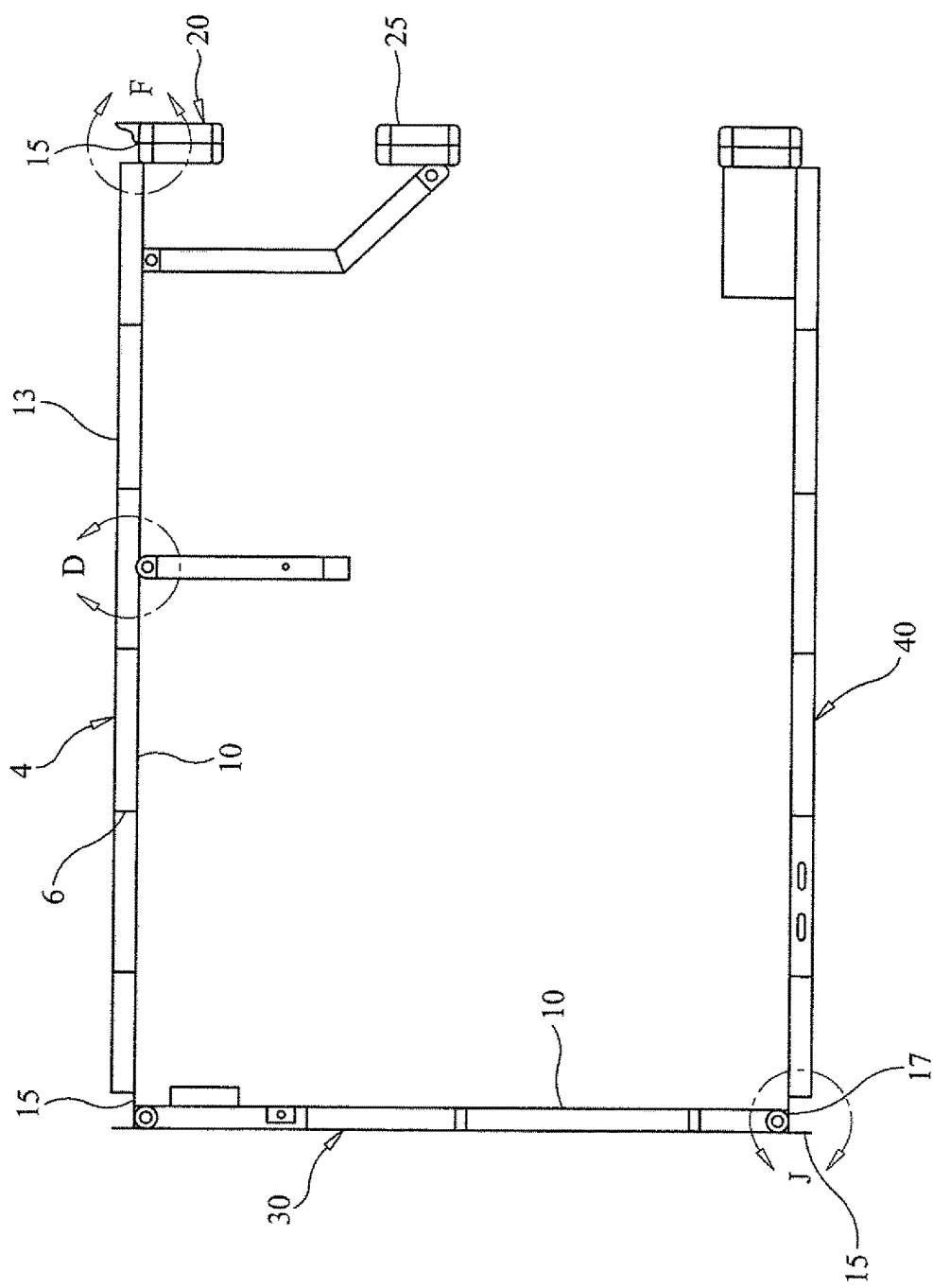
FIG. 2 is a diagrammatic cross sectional view taken along line 2-2 of FIG. 1 of the side, rear, front and chase walls of the prefabricated jail cell of FIG. 1 with letter designations of portions of the structure which are shown in detail in subsequent drawing figures.
Figure 3:
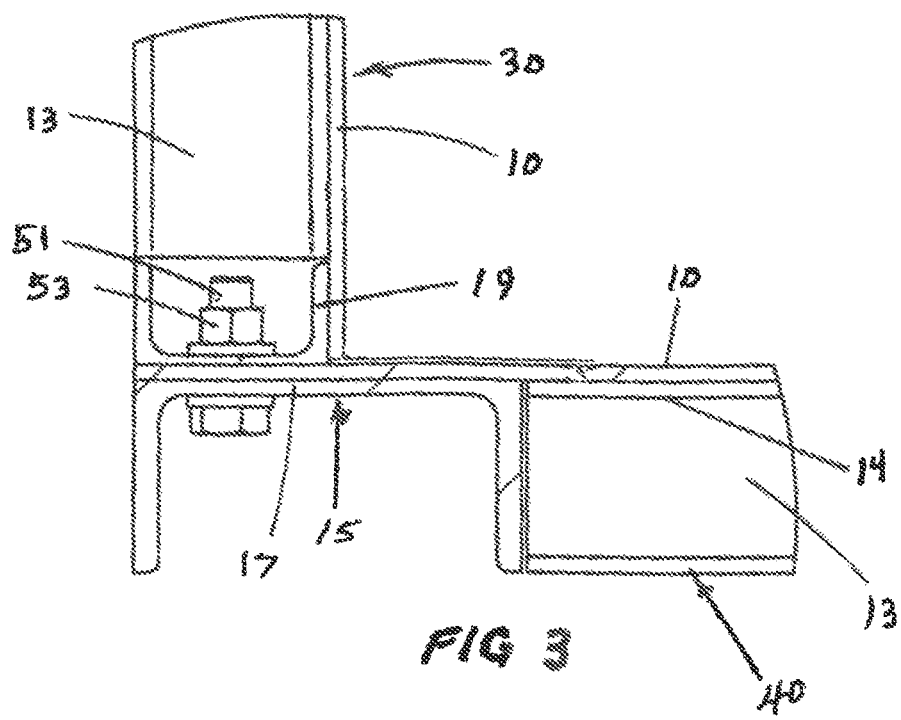
FIG. 3 is a cross sectional view of the corner connection between the rear wall and the left side wall at J in FIG. 2.

The first illustrated example of the inventive interconnection of structural elements is seen in FIG. 3 (J of FIG. 2). The left side wall 40 is similar in construction to the right side wall 4, having a bottom edge delineated by the structural channel member 13 one of whose flanges 14 is attached to the back side of the interior wall plate 10. The rear end of the left side wall is defined by outwardly facing channel 15 whose web 17 is flush with and attached to the extended end of the wall plate 10. A connecting bolt 51 passes through apertures in the channel web 17 and the wall plate 10 and through the connecting component 19 of the structural element to be connected, the rear wall 30. A nut 53 secures the connection in traditional fashion. In this particular case the connecting component 19 is a channel member that also defines the end of the rear wall.

Figure 4:
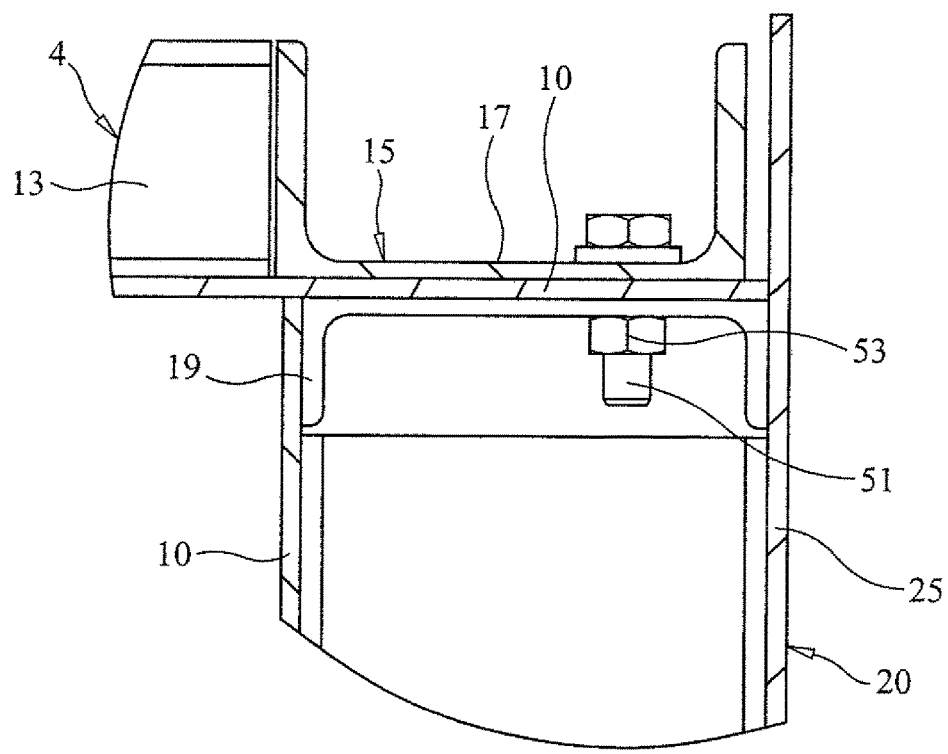
FIG. 4 is a cross sectional view of the front corner connection between the right side wall and the front wall at F in FIG. 2.

FIG. 4 depicts the connection of the present invention as applied to the right side wall 4 and its connection to a wider wall version, the front wall 20 (F of FIG. 2). The front end of the right side wall is defined by the channel member 15 whose web 17 is attached to the back side of an extended portion of the right side wall interior plate 10. The plate abuts a connecting component 19 of the front wall 20. The bolt 51 interconnects the right side wall and the front wall by its passage through the channel's web 17, the wall plate 10 and the connecting component 19. The nut 53 completes the fastening. The connecting component 19 is a structural channel similar to the channel 15 but in this case defining the right end of the front wall 20.

Figure 5:
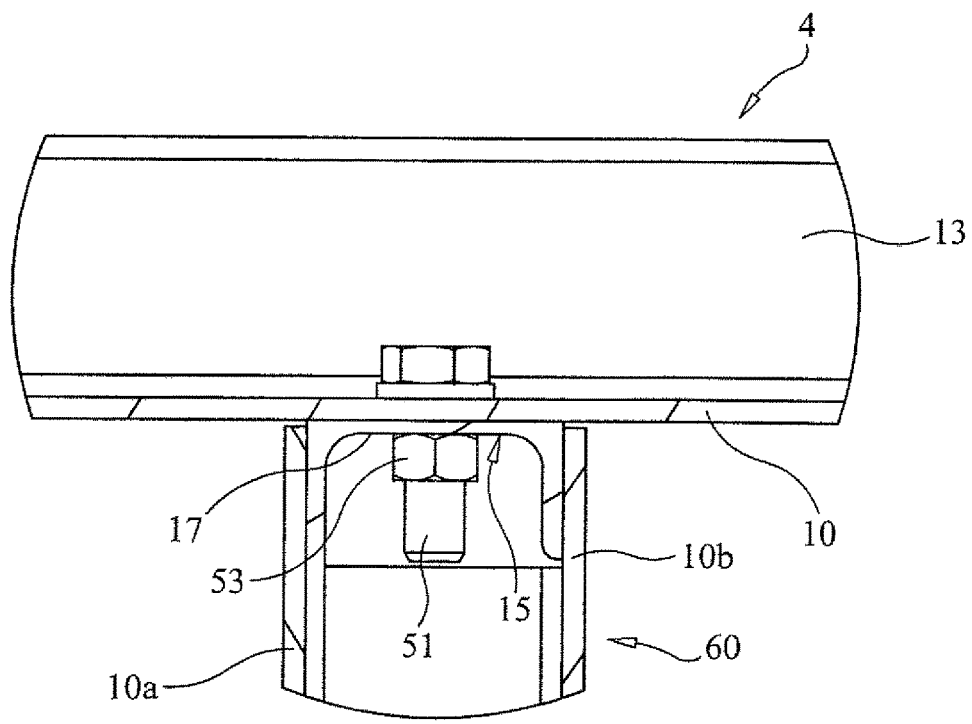
FIG. 5 is a cross sectional view of the shower wall connection with the right side wall at D in FIG. 2.

The connection of the present invention as applied to connect the end of an interior wall 60 to an intermediate point on an exterior wall, such as the right side wall 4, (D on FIG. 2) is illustrated in FIG. 5. An end-defining channel 15 is attached to the back sides of spaced apart extended wall plates 10a and 10b of an interior wall 60. In this species of the invention the end-defining channel faces longitudinally of the wall 60. The channel web 17 is flush against the connecting component of the wall to be connected, which, in this case, is the interior wall plate 10 of the right wall 4.

I claim:

1. A system for interconnecting the structural elements of a prefabricated jail cell comprising, a first structural wall comprising,
   a single wall-forming first plate having inside and back side surfaces,
   a plurality of mutually parallel spaced apart studs attached to the back side of the plate,
   at least one end-defining channel member, each having a web and opposed flanges, where the web is disposed flush against the back side of an extended portion of the plate and one of the flanges defines the terminal end of the first structural wall,
a second structural wall having,
   an end-defining connecting component disposed against the inside surface of the plate in opposition to the web of the end-defining channel member, and
   means for interconnecting the connecting component and the web of the end-defining channel member.

2. The system of claim 1 where the means for interconnecting the connecting component and the web of the end-defining channel member comprises a bolt and a nut.

3. The system of claim 2 where the second structural wall includes a single wall-forming second plate with inside and back side surfaces.

4. The System of claim 3 where the connecting component includes a structural channel member having a web and opposed outer and inner flanges where the web is disposed against the inside surface of the first plate and the inner flange is disposed against the back side surface of the second plate.

5. A system for interconnecting the structural elements of a prefabricated jail cell comprising,
   a first structural wall comprising,
      a single wall-forming first plate having inside and back side surfaces,
      at least one first end-defining channel member, each having a web and opposed flanges, where the web is disposed flush against the back side of an extended portion of the first plate and one of the flanges defines the terminal end of the first structural wall,
   a second structural wall having,
      a single wall-forming second plate having inside and back side surfaces,
      means for defining the end of the second structural wall disposed against the inside surface of the first plate in opposition to the web of the first end-defining channel member, and
      means for interconnecting the web of the first end-defining channel member and the means for defining the end of the second structural wall.

6. The system of claim 5 where the means for defining the end of the second structural wall is a second structural channel having a web and opposing flanges where the web of the second structural channel is flush with the inside surface of the first plate and in opposition to at least a portion of the web of the first end-defining channel member.

7. The system of claim 6 where the means for interconnecting the web of the first end-defining channel member and the web of the second structural channel includes at least one bolt which passes through the said webs and the first plate.

* * * * *